United States Patent [19]

Luciani

[11] Patent Number: 4,500,580

[45] Date of Patent: Feb. 19, 1985

[54] TAPING DOUGHNUT

[76] Inventor: Wayne Luciani, 1797 Litchfield Tpke., Woodbridge, Conn. 06525

[21] Appl. No.: 512,351

[22] Filed: Jul. 11, 1983

[51] Int. Cl.³ .................... B32B 3/10; B32B 29/00
[52] U.S. Cl. ................... 428/43; 428/131; 428/136; 428/537.1
[58] Field of Search ........... 428/40, 43, 131, 134, 428/136, 151, 155, 537.1; 242/7.23

[56] References Cited

U.S. PATENT DOCUMENTS

| | | | |
|---|---|---|---|
| 1,162,230 | 11/1915 | Foster | 428/43 |
| 4,386,126 | 5/1983 | Turner | 428/43 |
| 4,397,261 | 8/1983 | Jones | 428/40 |

FOREIGN PATENT DOCUMENTS 507863  6/1939  United Kingdom ............ 428/43

Primary Examiner—Paul J. Thibodeau
Attorney, Agent, or Firm—Bachman and LaPointe

[57] ABSTRACT

A taping paper for sealing a gap formed by a piece of sheetrock and an object piercing the sheetrock wherein a substantially flat substrate having a central axis and an outer peripheral surface is provided with, in the preferred embodiment, a plurality of continuous tear lines spaced apart from each other at different radial distances from the central axis. A method for sealing the gap is provided wherein the substrate is torn along a tear line which is approximately the same size and shape of the outer peripheral surface of the object piercing the sheetrock so as to form an opening substantially equal to the size and shape of the object.

10 Claims, 3 Drawing Figures

U.S. Patent  Feb. 19, 1985  4,500,580
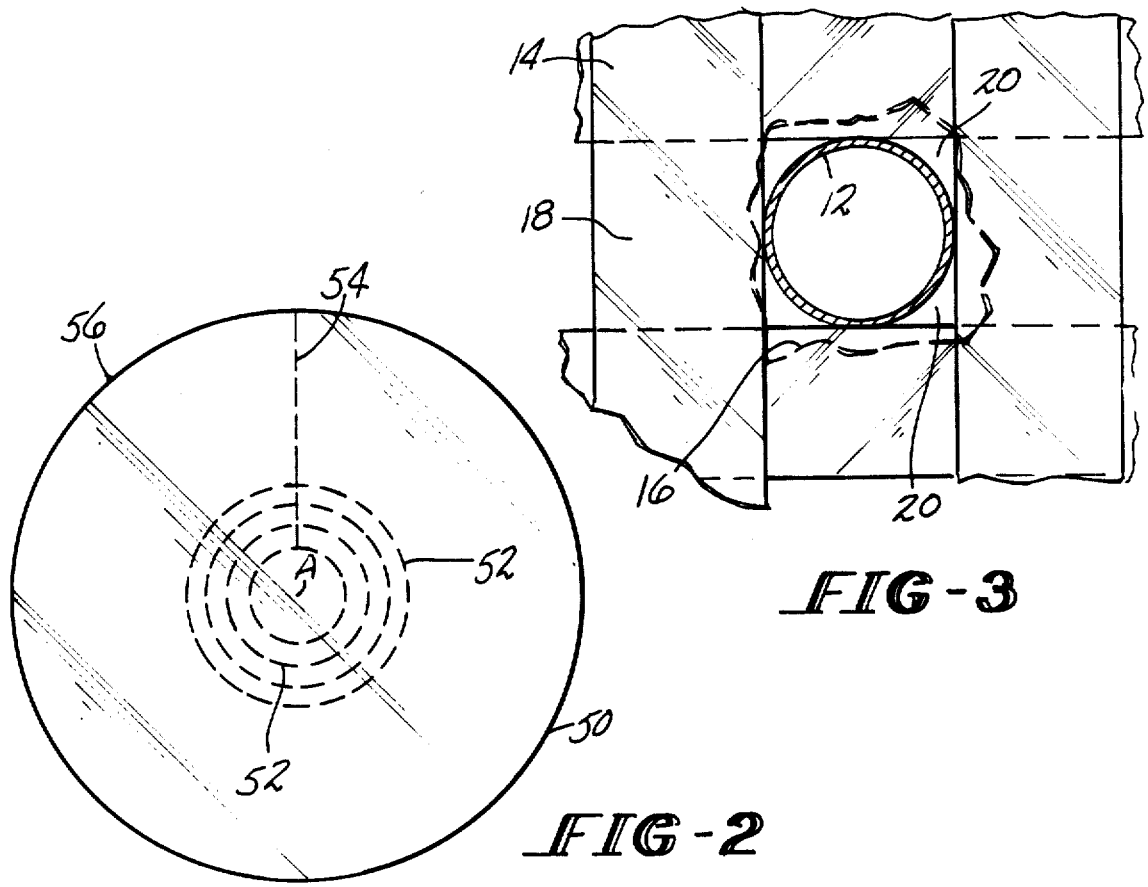
FIG-3
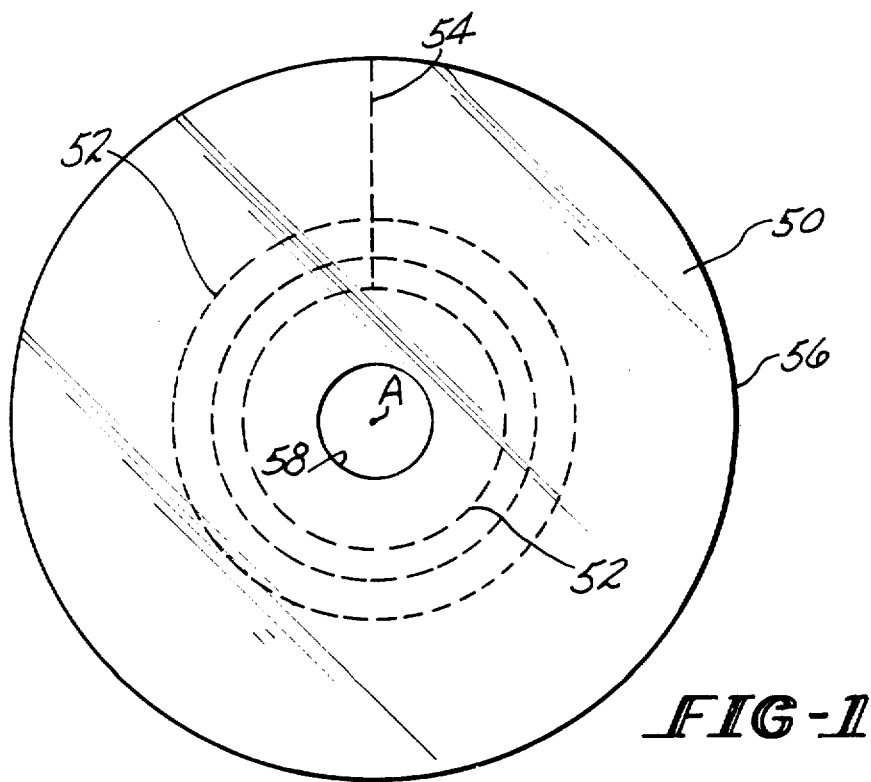
FIG-2
FIG-1

TAPING DOUGHNUT

BACKGROUND OF THE INVENTION

The present invention relates to taping paper for taping compound joints and the like used in joining sheetrock or the like and, more particularly, a doughnut shaped taping paper used to seal the space between an object which penetrates the sheetrock and the sheetrock itself.

When constructing a dwelling or the like there are numerous locations where water pipes, gas or oil pipes, electrical wire conduits, etc. must pierce a piece of sheetrock, wallboard, etc. leaving a gap between the sheetrock and the piercing object. In order to conserve energy and aid in fireproofing a building, it is highly desirable to seal the gap formed between the piercing object and the sheetrock as airtight as possible. Heretofore, the only method and material used to seal the foregoing noted gaps constituted strips of straight edged taping paper applied around the piercing object. As can be seen in FIG. 3, when employing the prior art material and method to pipes or the like, small gaps remained between the object and the sheetrock resulting in air loss and undesirable draft conditions. Naturally, it would be highly desirable to provide a joint seal tape and method of applying same which is capable of sealing the gap between the sheetrock and a piercing object in an airtight manner. In addition, it would be highly desirable to provide a joint seal tape and method of applying same as set forth hereinabove which is relatively inexpensive to manufacture, simple in construction and easy to install.

Accordingly, it is the principal object of the present invention to provide a joint tape paper and a method for applying same for sealing the gap between sheetrock and an object piercing same in an airtight manner.

It is a particular object of the present invention to provide a joint tape paper and method for applying same which is readily adjustable for sealing the gap formed between sheetrock and piercing objects of various sizes.

It is a further object of the present invention to provide a joint tape paper and method for applying same as set forth above which is relatively inexpensive to manufacture, simple in construction and easy to install.

Further objects and advantages of the present invention will appear hereinbelow.

SUMMARY OF THE INVENTION

In accordance with the present invention, the foregoing objects and advantages are readily obtained.

The present invention related to a taping paper for sealing a gap formed by a piece of sheetrock and an object piercing the sheetrock wherein a substantially flat substrate having a central axis and an outer peripheral surface is provided with, in the preferred embodiment, a plurality of continuous tear lines spaced apart from each other at different radial distances from the central axis. In a first embodiment of the present invention the substrate is provided with a non-continuous tear line extending from the outer peripheral surface of the substrate in the direction of the central axis. In an alternate embodiment of the present invention the substrate is provided with a slit extending from the outer peripheral surface in the direction of the central axis. In accordance with the method of the present invention the substrate is torn along a tear line which is approximately the same size and shape of the outer peripheral surface of the object piercing the sheetrock so as to form an opening substantially equal to the size and shape of the object. The object is then located in the formed opening and the paper is sealed to the sheetrock thereby sealing the gap. By way of the present invention airspaces are effectively sealed thereby aiding in energy conservation and fireproofing of a dwelling or the like in a relatively simple, inexpensive manner.

BRIEF DESCRIPTION OF THE DRAWINGS

FIGS. 1 and 2 are illustrations of the taping paper of the present invention used for sealing gaps in accordance with the method of the present invention.

FIG. 3 is a schematic illustration of the prior art method and material for taping compound joints.

DETAILED DESCRIPTION

Referring to the drawings, FIG. 3 illustrates the prior art method and material for taping the gap formed by a piece of sheetrock or the like and an object piercing the sheetrock. IN accordance with the prior art the object 12 piercing the sheetrock 14 through an opening 16 is taped by means of rectangular strips of taping paper 18 which, when applied, leave gaps 20 between the straight edge surfaces 22 of the tape and, as illustrated in FIG. 3, the lower surface of the object 12 piercing the sheetrock 14. The gaps 20 can result in substantial air loss which is undesirable from an energy conservation standpoint. In addition, the gaps may lead to air drafts which are undesirable when attempting to fireproof a dwelling or the like.

In accordance with the present invention as illustrated in FIGS. 1 and 2, a taping paper 50 is provided having a plurality of continuous tear lines 52 provided thereon. By the term continuous it is meant that the tear lines form a substantially closed loop. As illustrated in FIGS. 1 and 2 the tear lines are shown to be circular in shape. However, it should be appreciated, depending on the shape and size of the object piercing the sheetrock, that the continuous tear lines may be of any configuration, namely, square, rectangular, oval, triangular or the like. Returning to FIGS. 1 and 2 the continuous tear lines 52 are spaced from the central axis A of the taping paper at different radial distances which correspond to specific desired sizes of pipes or the like which may be the object piercing the sheetrock. For example, in constructing a dwelling it is not uncommon to have water pipes and the like whose sizes vary from $\frac{3}{8}$" to $\frac{3}{4}$" in diameter. In such a case one might scribe the tear lines on the substrate at various radial distances for the central axis such as 3/16", $\frac{1}{4}$", $\frac{3}{8}$", etc. In addition to the continuous tear lines 52, in one embodiment of the present invention a non-continuous tear line 54 is provided on the substrate and extends from the outer peripheral surface 56 of the substrate in the direction of the central axis A. In an alternate embodiment, a slit may be substituted for the non-continuous tear line 54. The substrate may be doughnut shaped as illustrated in FIG. 1 and be provided with a central opening 58 of desired size or may be solid as shown in FIG. 2. In accordance with the method of the present invention the substrate is torn along the continuous tear line which is approximately the same size and shape of the outer peripheral surface 56 of the object piercing the sheetrock so as to form an opening in the substrate which is substantially equal to the size and shape of the object piercing the sheetrock.

The object is then located in the formed opening by sliding the object through the slit or now torn non-continuous tear line 54 and the paper is sealed to the sheetrock thereby sealing the gap. In accordance with the present invention the airspaces are effectively sealed thereby aiding in energy conservation and fireproofing of a dwelling or the like in a relatively simple and inexpensive manner.

In accordance with the present invention the taping paper may be made of a fire resistant material such as asbestos paper or any other suitable fireproof material. As noted above the present invention as illustrated in FIGS. 1 and 2 shows the continuous tear lines to be circular in configuration, however, it should be appreciated that the continuous tear lines may be of any desired configuration which may be required in normal everyday construction work.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a building construction system, a taping paper used for sealing a gap formed by a piece of wallboard and an object piercing said wallboard comprising a substantially flat surface having a central axis and an outer peripheral surface and a plurality of continuous concentric tear lines spaced at different radial distances from said central axis, said plurality of continuous tear lines being adapted to be torn so as to define an opening through which said object piercing said wallboard fits and further including a non-continuous tear line extending from said outer peripheral surface of said substantially flat surface in the direction of said central axis wherein said non-continuous tear line intersects said plurality of continuous concentric tear lines wherein said non-continuous tear line is adapted to be torn so as to define an opening for fitting said taping paper over said object such that said object fits into said opening defined by the torn continuous tear line.

2. A taping paper according to claim 1 wherein said substantially flat surface has an inner peripheral surface defining a hole.

3. A taping paper according to claim 1 wherein said non-continuous tear line extends from said outer peripheral surface to said central axis.

4. A taping paper according to claim 2 wherein said non-continuous tear line extends from said outer peripheral surface to said inner peripheral surface.

5. A taping paper according to claim 1 wherein said plurality of continuous concentric tear lines are circular in shape.

6. In a building construction system, a taping paper used for sealing a gap formed by a piece of wallboard and an object piercing said wallboard comprising a substantially flat surface having a central axis and an outer peripheral surface and a plurality of continuous concentric tear lines spaced at different radial distances from said central axis, said plurality of continuous tear lines being adapted to be torn so as to define an opening through which said object piercing said wallboard fits and further including a slit extending from said outer peripheral surface of said substantially flat surface in the direction of said central axis wherein said slit intersects said plurality of continuous concentric tear lines so as to define an opening for fitting said taping paper over said object such that said object fits into said opening defined by the torn continuous tear line.

7. A taping paper according to claim 6 wherein said substantially flat surface has an inner peripheral surface defining a hole.

8. A taping paper according to claim 6 wherein said slit extends from said outer peripheral surface to said central axis.

9. A taping paper according to claim 7 wherein said slit extends from said outer peripheral surface to said inner pripheral surface.

10. A taping paper according to claim 6 wherein said plurality of continuous concentric tear lines are circular in shape.

* * * * *